US007320727B2

United States Patent
Jou et al.

(10) Patent No.: US 7,320,727 B2
(45) Date of Patent: Jan. 22, 2008

(54) MULTI-VISCOSITY PRINTER INK

(75) Inventors: Jeng-Dung Jou, Irvine, CA (US); Dennis R. White, Fountain Valley, CA (US); Gordon B. Barrus, San Juan Capistrano, CA (US)

(73) Assignee: Printronix, Inc., Irvine, CA (US)

( * ) Notice: Subject to any disclaimer, the term of this patent is extended or adjusted under 35 U.S.C. 154(b) by 0 days.

(21) Appl. No.: 11/056,963

(22) Filed: Feb. 11, 2005

(65) Prior Publication Data

US 2005/0191424 A1    Sep. 1, 2005

Related U.S. Application Data

(63) Continuation-in-part of application No. 10/316,784, filed on Dec. 11, 2002, now abandoned.

(60) Provisional application No. 60/411,959, filed on Sep. 19, 2002.

(51) Int. Cl.
 *C09D 11/00* (2006.01)
(52) U.S. Cl. .............................. 106/31.13; 106/31.27; 106/31.6

(58) Field of Classification Search ............. 106/31.13, 106/31.27, 31.6
See application file for complete search history.

(56) References Cited

U.S. PATENT DOCUMENTS

| 5,667,317 | A  | * | 9/1997 | Tan ........................... 400/197 |
| 6,443,551 | B1 | * | 9/2002 | Matsumoto .................. 347/21 |
| 7,001,091 | B1 | * | 2/2006 | Knight ......................... 401/47 |

* cited by examiner

*Primary Examiner*—J. A. Lorengo
*Assistant Examiner*—Veronica Faison-Gee
(74) *Attorney, Agent, or Firm*—MacPherson Kwok Chen & Heid LLP; Tom Chen

(57) ABSTRACT

A printing ink for use within multiple ambient temperatures which comprises a mixture of two or more inks having different viscosities at a given temperature. Thus, one or more lower viscosity inks having, for example, a viscosity in the range of about 300 cps to about 900 cps is mixed with one or more higher viscosity inks having, for example, a viscosity range of about 1100 cps to about 1800 cps to provide a multi-viscosity ink mixture useful over a wide temperature range.

19 Claims, 7 Drawing Sheets

MULTI-VISCOSITY PRINTER INK

CROSS-REFERENCE TO RELATED APPLICATIONS

This application is a continuation-in-part application of U.S. patent application Ser. No. 10/316,784, filed Dec. 11, 2002, now abandoned which claims the benefit and priority of U.S. Provisional Application Ser. No. 60/411,959, filed Sep. 19, 2002.

BACKGROUND

1. Field of the Invention

The invention relates to printer inks and printing systems.

2. Related Art

Viscosity for an ink is a measure of the ink's thickness. Low viscosity printer ink loses shear strength at high temperatures even when disposed on a carrier such as a printer ink ribbon. Within impact printing applications such as those using an ink ribbon, this can result in ink smearing and ink migration. This lowers the print quality.

On the other hand, the viscosity of an ink that performs well at elevated temperatures becomes excessively high as to its viscosity at lower temperatures. Excessively high ink viscosity exhibits other printing problems. The problems can include poor transfer into and out of the printer ribbon, resistance to pumping through small tubing, and a very slow transfer through foam materials. Such foam materials can be used in an ink reservoir roller to replace ink within the printer ribbon.

An ideal printer ink should flow easily when the ambient temperature is cold. The ideal ink should also remain thick enough so that it will not excessively migrate when the temperature is hot. Low ambient temperatures require a light (i.e., low viscosity) ink and high temperature requires a heavy (i.e., high viscosity) ink.

Viscous flow as to ink can be pictured as taking place by the movement of molecules or segments of molecules from one place in a lattice to a vacant hole. The total "hole" concentration can be regarded as a space free of polymer or free volume (see, e.g., Rodriguez, F., Principles of Polymer Systems, 3:177, 1989). Doolittle proposed (Doolittle, A. K., J. Appl. Phys., 22:1471, 1951) that the viscosity should vary with the free volume and free volume is expected to vary with temperature. The diffusion and movement is closely related to the size of a molecule represented by the hydrodynamic volume.

Low temperatures are favorable to small molecule movement whereas high temperatures are conducive to the movement of either small or large molecules. Thus when inks having small molecules are exposed to high temperatures, they move with great freedom. Inks having large molecules can also move freely at high temperatures but not as freely as with small molecules, and not effectively at low temperatures.

SUMMARY

According to one aspect of the invention, when both small and large molecules of ink are mixed together, they intermingle so that the smaller molecules are carried along with the larger molecules. This causes a synergistic property wherein the combined fluid acts more like the small molecules at lower temperatures and the large molecules at elevated temperatures.

In one embodiment, a mixture of two or more substances (with at least one being an ink) forms multi-viscosity inks wherein the high molecule-weight spread (i.e., high polydispersity) performs well at a full temperature range in which print systems such as impact printers are expected to operate. These multi-viscosity inks remain sufficiently viscous at elevated temperatures, while maintaining a lower-than-normal viscosity at lower temperatures.

Aspects of the present invention comprise a blended, multi-viscosity (MV) ink mixture for printing applications, yielding a more consistent viscosity throughout the operational temperature range expected of industrial impact printers.

More particularly, in one embodiment, the invention utilizes an ink formulation that incorporates two or more mono-viscous ink components, combined in ratios to produce a united multi-viscosity ink. The lower viscosity inks or components influence the combination by lowering its "apparent viscosity" at lower operating temperatures. The higher viscosity inks or components influence the combination by maintaining sufficient viscosity for printing applications at the higher end of operating temperatures. The net effect is that the "apparent viscosity" remains more nearly constant across the printer's operating temperature range, than is the case with single or mono-viscosity inks.

The low and high viscosity inks can be any suitable commercially available ink. In one embodiment, low and high viscosity inks can be formulated by introducing an additive, such as a fatty acid, to dissolve dye components. Higher concentrations of dye result in larger ink molecules and thus higher viscosity inks. In one embodiment, the fatty acid is oleic acid.

Using multi-viscosity ink mixtures in impact or other printing technologies improves printing results. It helps to reduce or eliminate the propensity for ink smearing on the print media and ink migration into the printing mechanism at high temperatures. It also helps to maintain print density and ink distribution in an ink ribbon at lower temperatures.

Inks are primarily composed of pigments, vehicles and supplementary additives. Pigments are finely divided solid materials that give inks color and opacity or transparency. The function of the vehicle is to act as a carrier and as a binder to affix the pigment to the printed surface. The nature of the vehicle determines in a large measure the tack and flow characterization including viscosity. Supplementary additives include among others lubricants which act to influence flow characteristics, and dyes which impart ink color.

A method for printing with an ink mixture to compensate for varying ambient temperatures is also provided which includes mixing together a single viscosity ink with an additive to form a multi-viscosity ink mixture; and, printing with said mixture on a medium to be printed upon.

This invention will be more fully understood in conjunction with the following detailed description taken together with the following drawings.

BRIEF DESCRIPTION OF THE DRAWINGS

Use of the same or similar reference numbers in different figures indicates same or like elements.

DETAILED DESCRIPTION OF THE PREFERRED EMBODIMENTS

Figure 5:
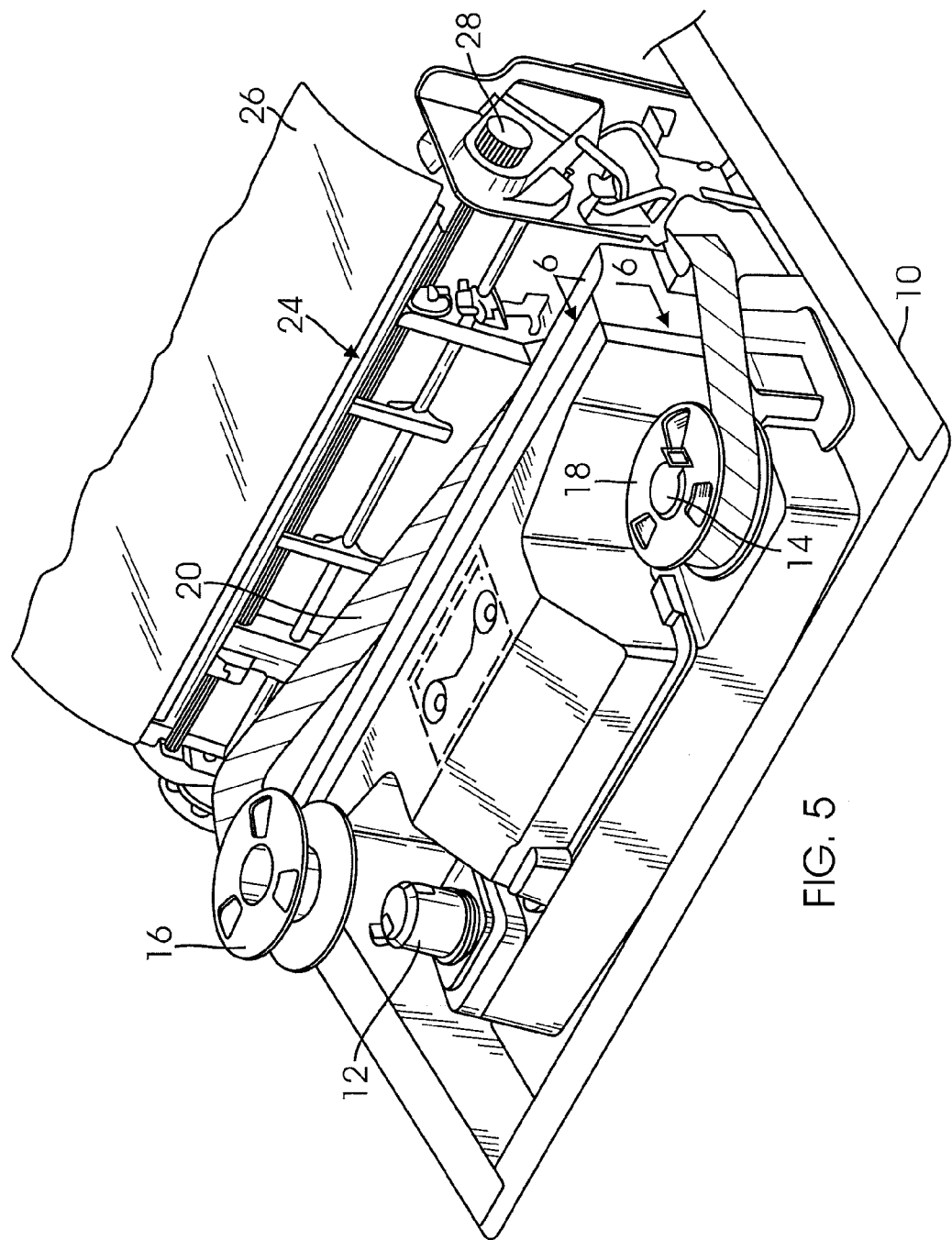
FIG. 5 shows a perspective view of a fragmented portion of an impact printer having a print ribbon which can use the ink of this invention.

Looking more specifically at FIG. 5, it can be seen that a printer 10 is shown having spindles or hubs 12 and 14.

The hubs 12 and 14 receive respectively spools of print ribbon 16 and 18. The ribbon in these respective spools moves forwardly and backwardly across the face of a number of hammers on a printer hammerbank facing the print ribbon 20 that is wound around the spools 16 and 18.

In order to support paper, a paper support 26 is shown with a splined shaft 24 and knob 28 to advance paper along a tractor.

Figure 6:
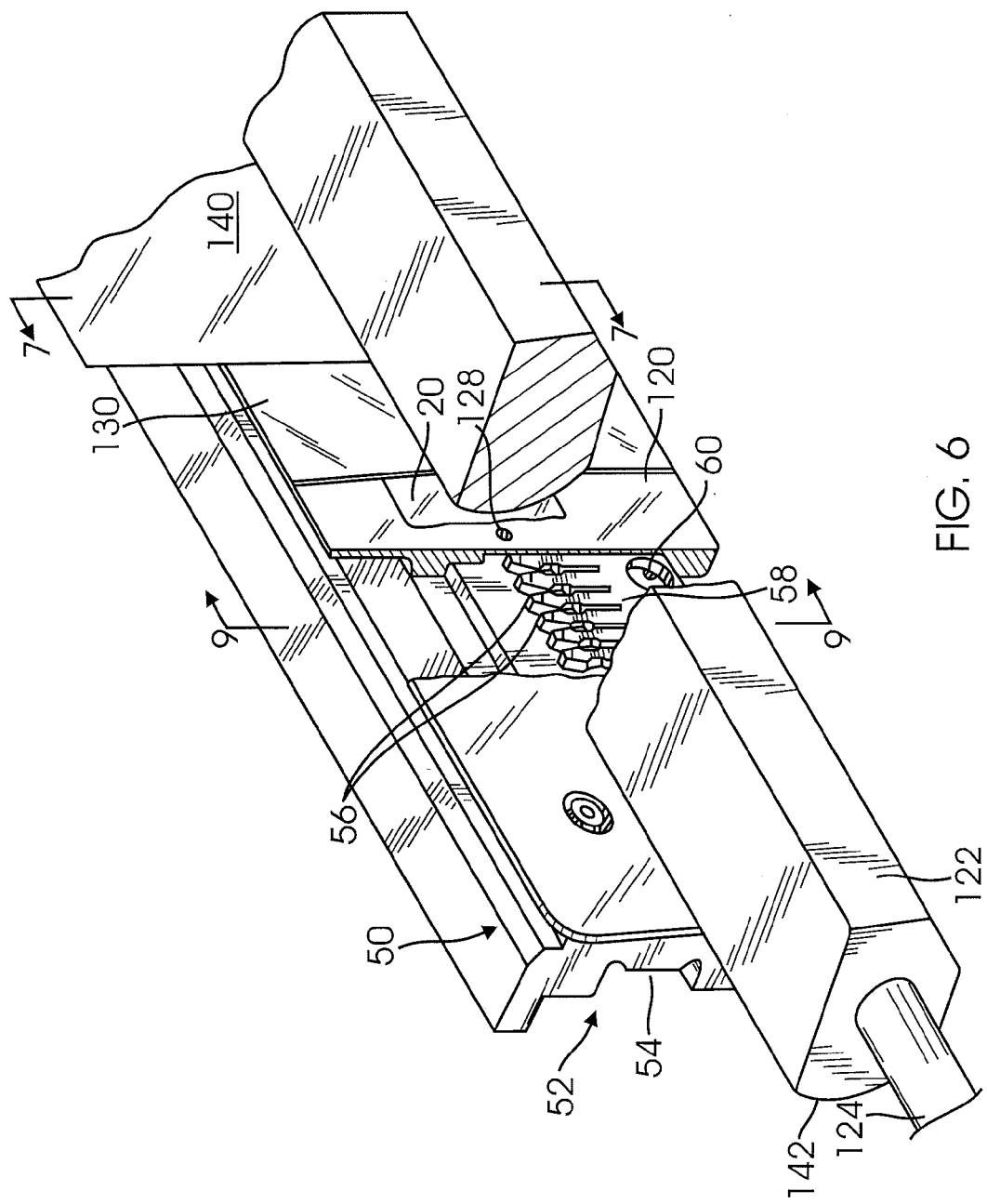
FIG. 6 is a fragmented perspective view showing a hammerbank, platen, and the associated portions in the direction of lines 6-6 of FIG. 5.

Looking specifically at FIG. 6, it can be seen that a hammerbank portion of the impact line printer in the form of a fragmented segment toward the end of the hammerbank is shown. The fragmented portion of the hammerbank is a segment that is cut from an elongated hammerbank having approximately anywhere from forty to one hundred print hammers more or less. The print hammers can be retained and then fired or released against a print ribbon as is well known in the art.

The hammerbank 50 is such wherein the base or shuttle is generally machined or cut from an elongated metal portion such as an aluminum casting or extrusion. It can be formed in any other suitable manner to provide for an elongated mounting of the hammers on the hammerbank. In this particular case, it can be seen that the hammerbank has a rear channel area 52 which can receive an elongated circuit board or other controlling means such as in U.S. Pat. No. 5,743,665 Entitled a Printer Integrated Driver and Hammerbank dated Apr. 8, 1998 naming Robert P. Ryan and Gordon Barrus as inventors. The hammerbank 50 has an elongated channel or groove 54 which receives a permanent magnet as will be described hereinafter.

As is customary in line printer hammerbanks, they can comprise a series of hammers 56 connected to and formed on a fret 58. The fret 58 is secured to the hammerbank by screws, nuts or bolts or any other securement means shown generally as screws 60.

Figure 9:
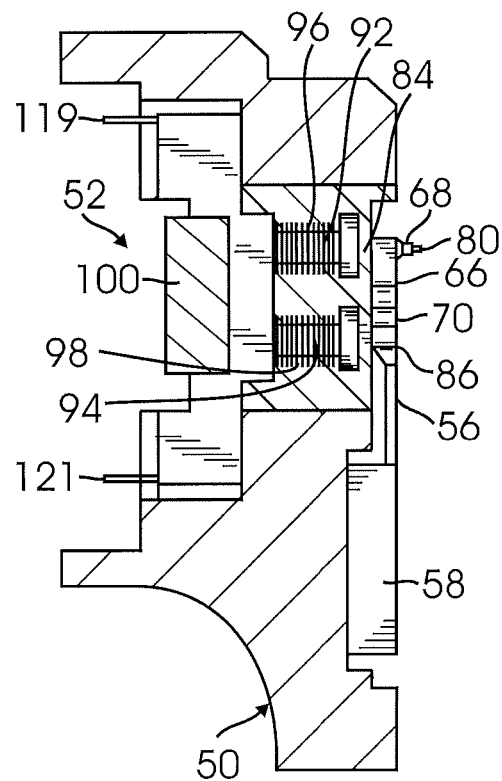
FIG. 9 is a sectional view in the direction of lines 9-9 of FIG. 6 showing the magnetics and hammers of the impact printer of this invention.

As detailed in FIG. 9, the hammers 56 comprise an enlarged portion 66 to which a pin 68 is welded, brazed or otherwise connected thereto. The enlarged portion 66 terminates in a necked down spring portion 70 connected to and formed with the fret 58. This entire structure and shape of the hammers 56 can be configured in other suitable manners to allow for the dynamics of printing as is understood in the art.

Figure 8:
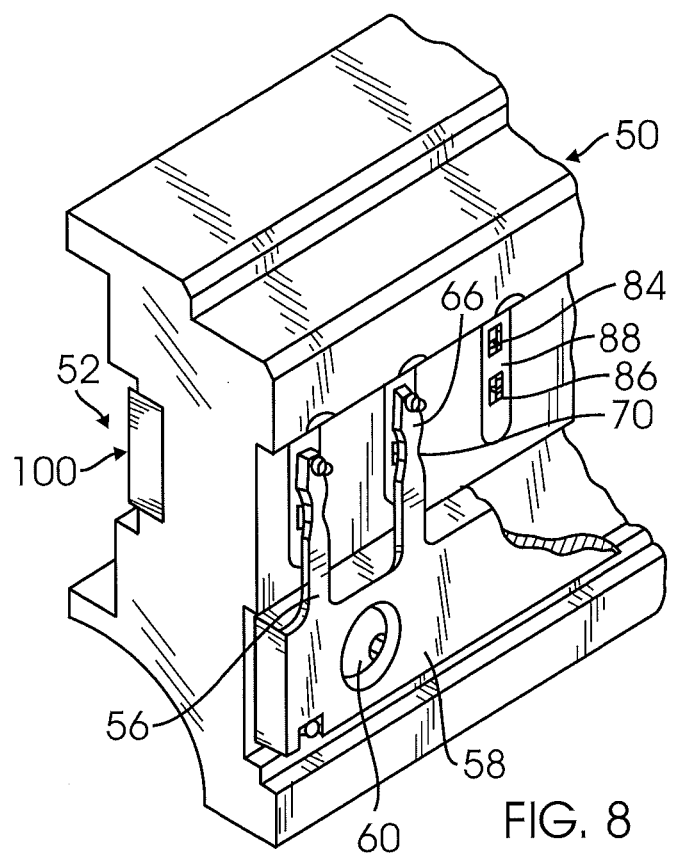
FIG. 8 is a fragmented perspective elevation view of the hammerbank and print hammer details.

As seen in FIGS. 8 and 9, each pin 68 has a reduced tip 80. The reduced tip 80 is the portion that is impacted against the ribbon 20. This forms a dot matrix printing array, pattern, alpha numeric symbols, Oriental style lettering, a particular pattern, or pictorial representation.

In order to retain the hammers 56 which are sprung for printing movement away from the hammerbank, a permanent magnetic force is applied through a pair of pole pins, pole pieces, or pole members which provide the magnetic circuit. These terminate in upper and lower pole piece termination sections, hammer contacts, terminals or pins, 84 and 86. These pole piece terminal portions 84 and 86 are generally provided with a surface 88 therebetween against which a hammer 56 can be retracted and creates an impact or wear surface.

Looking more particularly at FIG. 9 the terminal points or magnetic contact portions of the pole pieces 84 and 86 are shown with their pole pieces 92 and 94. The pole pieces 92 and 94 are wound with wire coils 96 and 98.

In FIGS. 8 and 9 it is seen that a retention magnet 100 is shown. The magnet 100 allows for the magnet to be placed in the channel 54 against the rearward ends of the pole pieces 92 and 94. The pole pieces 92 and 94 allow placement of the magnet 100 there against to provide in turn for a magnetic circuit through the pole pieces 94 and 96.

The leads and terminals 119 and 121 are utilized to allow for conduction of a driving voltage to the respective coils 96 and 98 around pole pieces 92 and 94.

The hammerbank fret 58 terminates in the upwardly projecting hammers 56. The hammers 56 have the attendant enlarged portions 66 and necked down intermediate portions 70 serving a dominant spring function with the pins 68 having the striking portions or tips 80.

The foregoing configuration as to the pole pieces 92 and 94, and the magnet 100, are potted.

Figure 7:
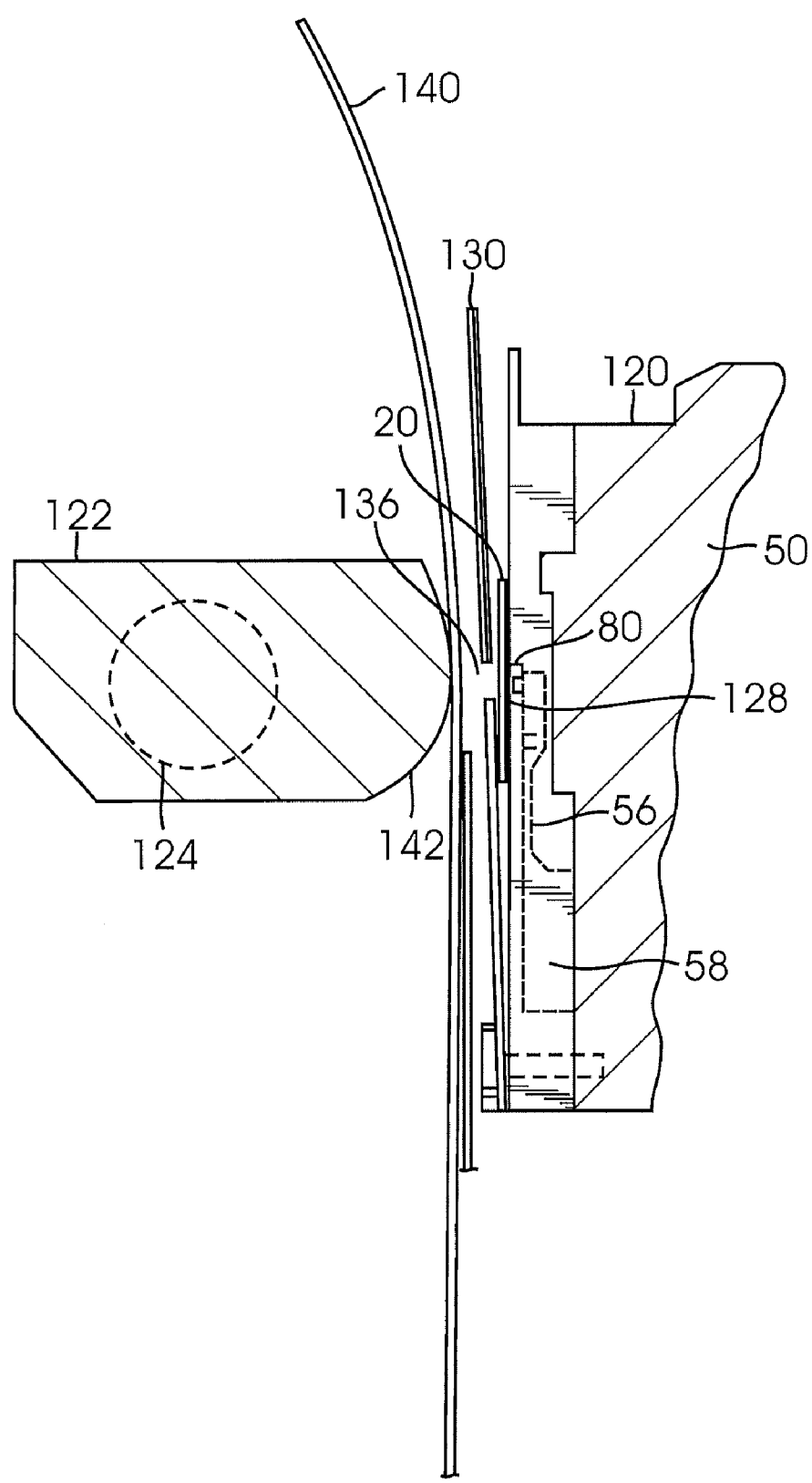
FIG. 7 is a sectional view in the direction of lines 7-7 of FIG. 6.

Looking more specifically at FIGS. 6 and 7, it can be seen that the operational aspects of the line printer are shown with paper or other media 140 passing there through. The hammerbank 50 has been fragmented to show the attachment of the cover thereon.

The fret 58 and the attendant hammer 56 has been shown in FIG. 7 in a dotted configuration along with the tip 80 extending therefrom. In FIG. 7, the details are more pronounced in the cross-section. The printer includes a platen 122 with a platen adjustment extension 124 which provides for the rotation of the platen in and out of the operating position.

Looking more particularly beyond the cover 120 and the respective hammers 56 that are therebehind, it can be seen that the ribbon 20 is shown. The ribbon 20 is the one impacted by the tips 80 of the hammers 56. The tips 80 extend through the openings 128.

Between the ribbon 20 and the paper or media 140 to be printed on is a ribbon mask 130. This ribbon mask 130 is such wherein it provides for masking of the print from the entire ribbon 20. This helps to eliminate print ribbon smear and ink being spread in an unwanted manner as the hammer tips 80 pass through the openings 136 of the mask 130. The paper or media 140 passes over the platen face 142 of the platen 122. This allows the hammers 56 when released to be impacted against the ribbon 20 and attendantly cause printing on the underlying media or paper 140.

The cover 120 incorporates the hammer tip openings 128 in a plural line of openings along the length thereof. This allows for the tips 80 of the hammers 56 to extend therefrom and provide an impact upon the paper or underlying media 140 on the opposite side of the mask 130.

As can be appreciated from the foregoing description with regard to a line printer such as that shown in FIGS. 6 through 9, it can be seen that ink when placed on the print ribbon 20 would have a chance for migration if it can readily flow. This is based upon not only gravitational forces but also merely the aspects of movement and impact of the ink ribbon 20.

In order to compensate for this, it has often been necessary to disadvantageously use overly viscous or light inks in order to compensate for ambient temperatures. As can be appreciated, if the ambient temperature were not correct, the ink would either be gummy on the ribbon 20 or flow excessively.

Looking more particularly at FIGS. 7, 8, and 9, it can be seen that ink from the print ribbon 20 when placed thereon could gravitate and smudge through the openings 136 against the media 140 that is to be printed upon. It becomes particularly apparent when considering the fact that the hammer pins 68 with the hammer tips 80 when striking the ribbon cause greater migrational flow of the ink. Further to this extent, the ink tends to flow more rapidly in high ambient temperatures. Of course, in low ambient temperatures the lighter or less viscous ink on the ribbon 20 would be to an advantage because of the fact that it would not flow as readily.

This invention allows for more controlled flow of the ink from the ribbon 20 against the media 140. It helps to prevent smudging through the openings such as opening 136 or on the mask 130. The ink mixture of this system functions to substantially diminish many of the problems in the prior art of such impact printers.

Figure 1:
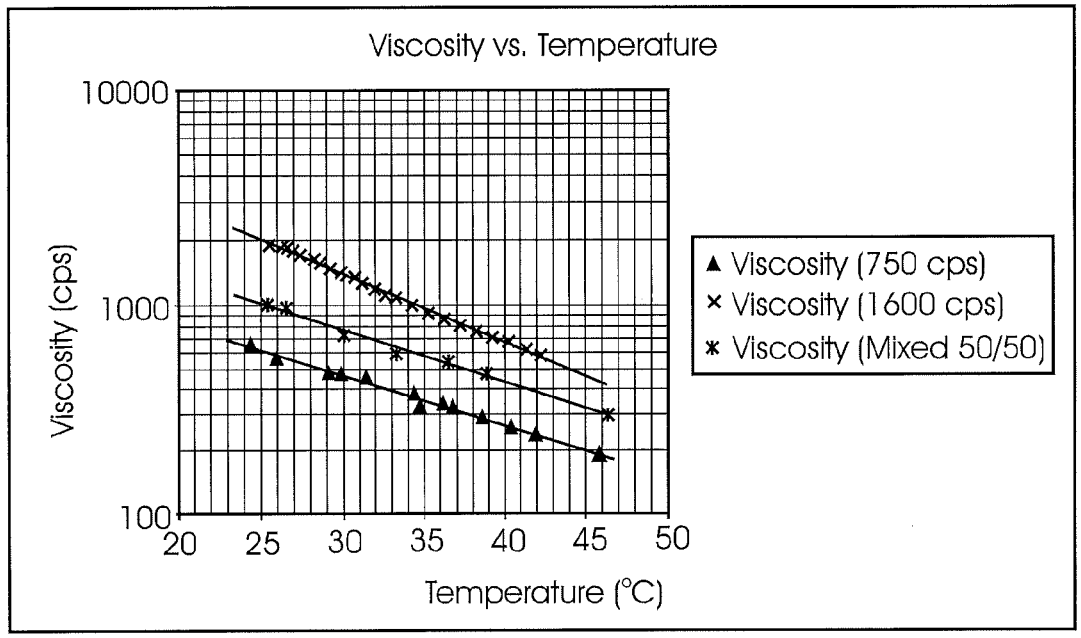
FIG. 1 shows a graph of viscosity-versus temperature on a logarithmic scale for a 50/50 by volume mixture of inks, one ink having a viscosity of 750 cps and one ink having a viscosity of 1600 cps as compared with each single or mono-viscosity ink.

In FIG. 1, based upon a logarithmic scale, the multi-viscosity ink mixture consists of inks of high and low viscosity mixed together. This produces a hybrid ink mixture with synergistic properties. The foregoing example utilized a mixture containing 50% by volume of an ink having a low viscosity of 750 cps and 50% by volume of an ink having a high viscosity of 1600 cps at room temperature. For purposes of this application with respect to the given viscosities, room temperature is defined as 25° C. A 50% mixture by volume was chosen in order to determine whether the resultant viscosity would exhibit a proportional relationship to the constituent viscosities. If so, then the resultant viscosity curve would lie equidistant from the constituent curves.

From the results, it was found that low temperature is not detrimental to small molecule movement. High temperature is conducive to the movement of either small or large molecules. The resultant effect on viscosity was not proportional to the percentage of the mix. For instance by adding an equal amount of high viscosity ink (for example 50%) to an amount of low viscosity ink (for example 50%), a disproportional effect in a low ambient temperature was found. The resulting "apparent viscosity" exhibits high temperature viscosity only slightly lower than the high viscosity constituent, yet significantly lower viscosity at low temperatures, than the high viscosity constituent.

Figure 2:
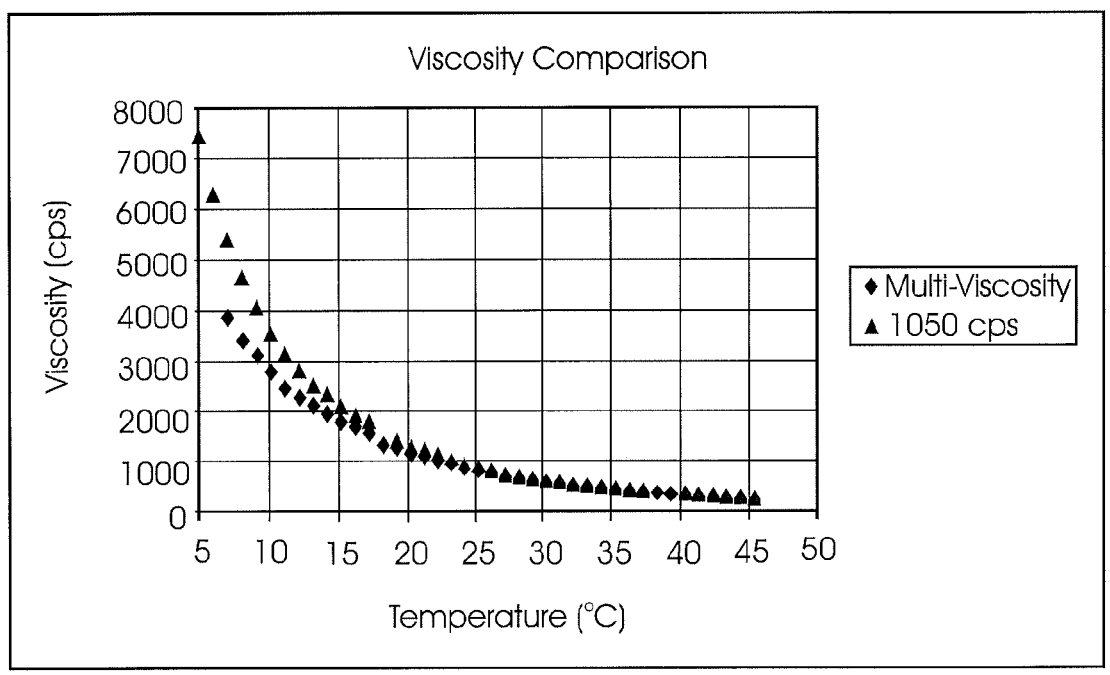
FIG. 2 shows a graph of a viscosity comparison of a single viscosity ink of 1050 cps and a 50/50 by volume ink mixture of an ink having a viscosity of 750 cps and an ink having a viscosity of 1600 cps.

FIG. 2 shows a viscosity comparison between a multi-viscosity ink mixture and a single viscosity ink. The multi-viscosity ink mixtures consist of equal parts by volume of an ink having a viscosity of 750 cps and an ink having a viscosity of 1600 cps. The single or mono-viscosity ink has a viscosity of 1050 cps.

The graph of FIG. 2 shows that a multi-viscosity ink mixture can improve the flow conditions at cold temperatures and maintain the same properties as single viscosity inks at room temperature and higher temperatures. However, other viscosities may be preferred and can be formulated for use in varying printing temperatures.

Viscosity studies have been conducted for inks with different pigment loads within the temperature range of 5° to 40° C. A preferred or idealized viscosity range was found to be around 1000 cps at room temperature. If the viscosity is too low at room temperature; it can cause ink smearing and ink migration at hot temperatures (40° C.).

From the data of FIG. 2, the multi-viscosity (MV) ink mixture can maintain ideal apparent ink viscosity at ambient room to high temperatures in comparison with uni-viscosity inks. This applies to both dye-based ink and pigmented ink.

In addition as seen in FIG. 2, the "apparent" (or "MV") ink viscosity is 3000 cps lower than uni-viscosity inks at 5° C. The temperature range (5° C. to 40° C.) within which the experiments were conducted corresponds to standard operational temperatures of many printers. In order to predict viscosity beyond this range, the following equation is helpful:

$$Pn(\Phi) = A - B\ T \quad (1)$$

The viscosity $\Phi$ is given in centipoises and the temperature T is expressed in Celsius. The coefficients, A and B in the equation are determined from regressing experimental ink-viscosity data. The equation can be used to anticipate results at temperatures beyond the limits of the experiments. The equation itself is limited in scope. Any viscous liquid, blended or not, will exhibit linear behavior (in logarithmic scale) only within some practical range. The actual limits of linearity will be dependent upon a particular material's characteristics.

Figure 3:
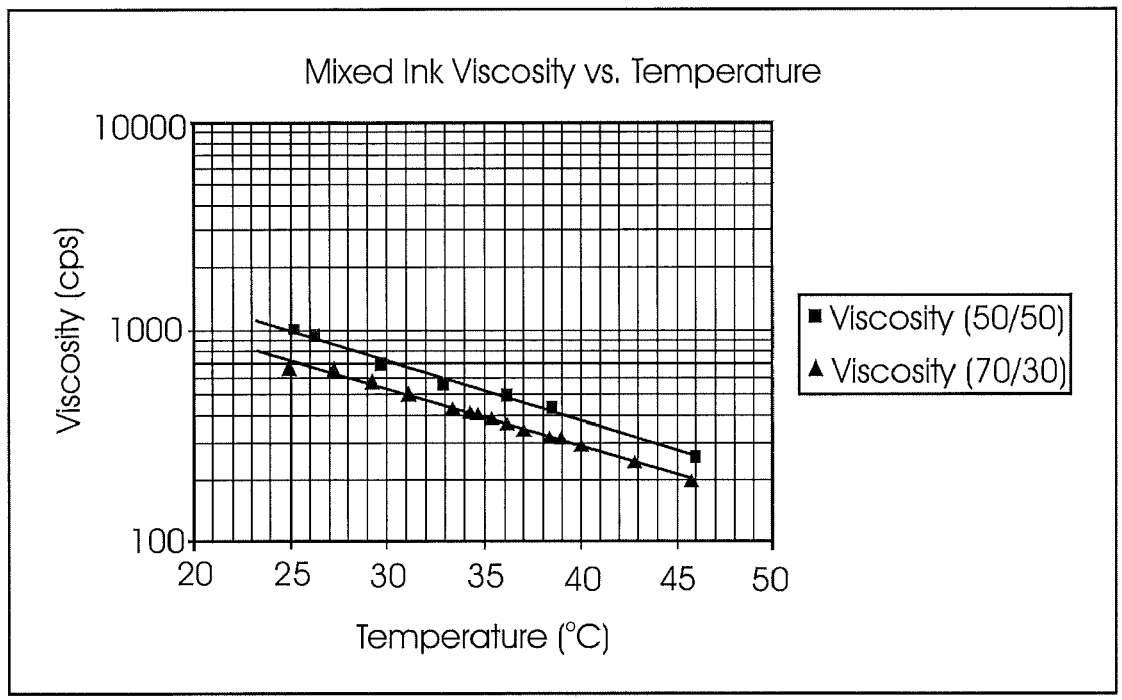
FIG. 3 shows a graph on a logarithmic scale of viscosity versus temperature for a 50/50 mixture and a 70/30 mixture of an ink having a viscosity of 750 cps and an ink having a viscosity of 1600 cps respectively.

FIG. 3 shows the comparison of two different multi-viscosity ink mixtures or combinations. The high viscosity ink has a viscosity of 1600 cps at room temperature. The low viscosity ink has a viscosity of 750 cps at room temperature.

The ink designated "Viscosity (50/50)": 50% by volume is a mixture of a Low viscosity ink of 750 cps and 50% by volume of a High viscosity ink of 1600 cps.

The equation for viscosity (50/50) pertaining thereto is:

$$Pn(\Phi) = 8.4 - 0.0593\ T \quad (2).$$

The ink designated "Viscosity (70/30)": 70% by volume is a mixture of Low viscosity ink of 750 cps and 30% by volume high viscosity ink of 1600 cps.

The equation of viscosity (70/30) pertaining thereto is:

$$Pn(\Phi) = 8.0 - 0.0563 T \quad (3).$$

From regressing equations, the ink combination (70/30) flattens the slope of the curve 5% and the intercept declines 5% in a logarithmic scale in comparison with a 50/50 by volume mixture.

Figure 4:
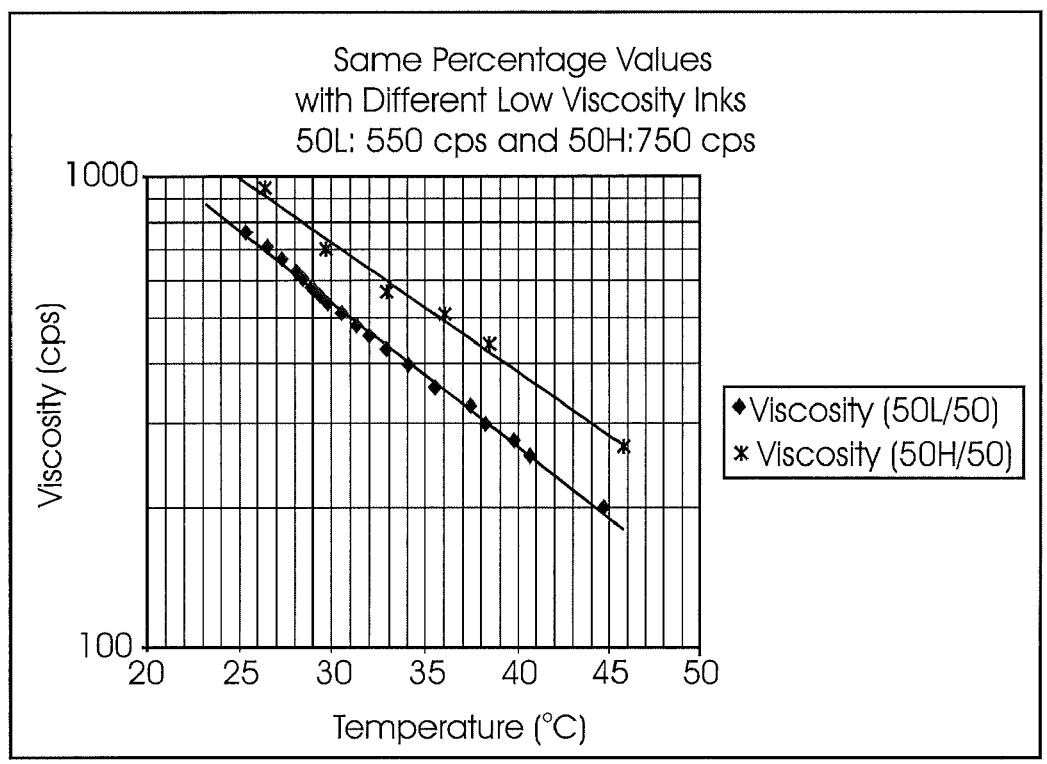
FIG. 4 shows on a logarithmic scale two different mixtures of low viscosity inks combined in the same volume proportions with the same high viscosity ink.

FIG. 4 shows a logarithmic graph of viscosity versus temperature for two different multi-viscosity ink mixtures in a 50% to 50% ratio by volume. One mixture incorporates a low viscosity ink of 550 cps with a high viscosity ink of 1600 cps. The other mixture incorporates a low viscosity ink of 750 cps with a high viscosity ink of 1600 cps. This diagram illustrates that by varying the viscosity values, and mixture percentages, it is possible to tailor a multi-viscosity ink mixture to optimize ink performance for a particular application. For example, if the desired multi-viscosity ink mixture is approximately 1000 cps at room temperature, a 50/50 mixture of a high viscosity ink of 1600 cps at room temperature with a low viscosity ink of 550 cps at room temperature will result in the proper multi-viscosity ink ((1600 cps*0.5)+(550 cps*0.5)). In applications in which operation at colder temperatures is a concern, a mixture having a higher proportion of a low viscosity ink may be preferred. This results in a larger number of smaller molecules for viscosity control at lower temperatures. In such a situation, a 1000 cps multi-viscosity ink can be obtained by mixing 30% of a high viscosity 1600 cps ink and 70% of a low viscosity 750 cps ink.

Based on the above, the ink manufacturer or user can create an optimal ink mixture based on a particular application and specific factors of importance such as operating temperature. Different combinations of commercially available ink can result in the same characteristics, with the preferred combination dependent on the application and included within the description provided herein. Furthermore, the actual composition of the low and high viscosity inks can be any suitable type of ink desired. As is well known in the art, there are many different ink compositions and types, such as aqueous based, oil based, pigment based, phosphorescent, and fluorescent inks. Some patents that disclose different ink compositions are U.S. Pat. Nos. 6,776,836, 6,231,655, 6,749,773, 6,702,881, 6,476,096, 6,379,440, 6,231,655, 5,344,483, and 4,386,961, all of which are incorporated by reference in their entirety. Also, as known in the art, there are a vast number of commercially available inks from different manufacturers that are either low viscosity or high viscosity. Such inks can be mixed, as set forth above, to create a multi-viscosity ink of the present invention.

Figure 10:
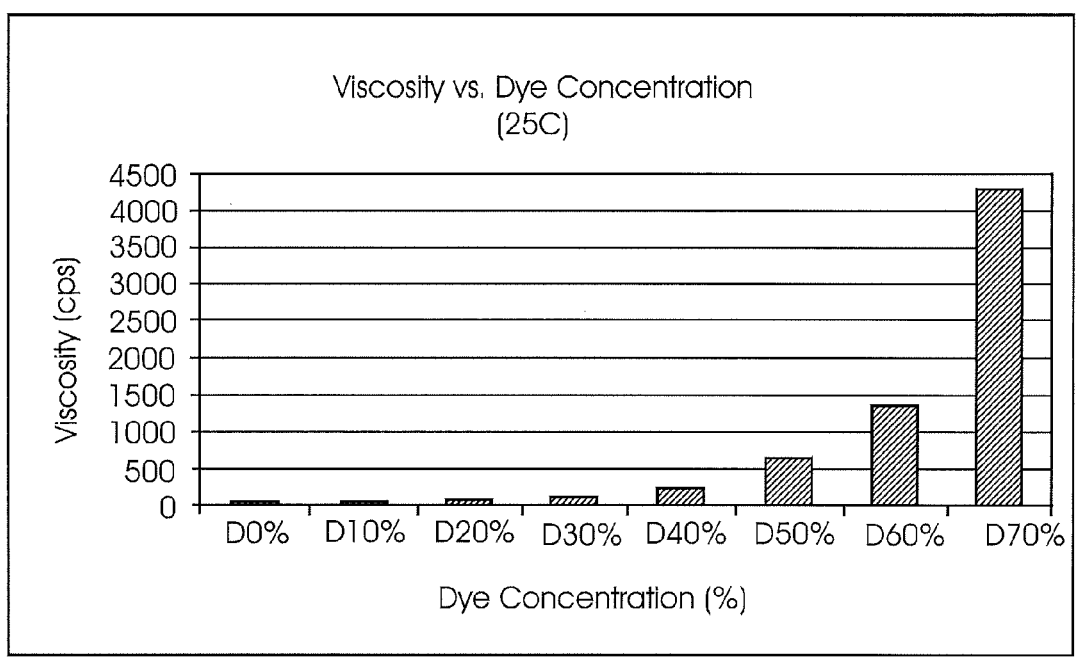
FIG. 10 is a graph showing viscosity as a function of dye concentration.

In some embodiments, low and high viscosity inks can be formed by varying the dye concentration in the ink. A vehicle (solvent), such as an oleic acid, polymerizes with the dye components. FIG. 10 is a graph showing the viscosity as a function of dye concentration by weight in one example. In this example, the dye is nigrosine, and the solvent is oleic acid. As seen from FIG. 10, lower concentrations of dye, e.g., 50% to 55% and less, result in low viscosity inks of approximately 750 cps or lower at room temperature. Higher concentrations of dye (e.g., 60% or higher) result in high viscosity inks of 1000 cps or more. Thus, a desired single viscosity ink can be obtained by varying the dye concentration accordingly. For example, a high viscosity ink of 1600 cps at room temperature can be obtained with a dye concentration of between 60 and 65%, while a low viscosity ink of 750 cps at room temperature can be obtained with a dye concentration of between 50 and 55%. The low and high viscosity inks can then be mixed to create a multi-viscosity ink as described herein.

While the examples shown and described herein illustrate a mixture of two inks of different viscosities it should be understood that the invention is not limited to a mixture of two inks of different viscosities but is intended to include mixtures of two or more inks of different viscosities (multiple poly-dispersion). For example, three or more inks of different viscosities can be selected based on the particular mono-viscosity of each ink forming the ink mixture so that the ink mixture can be tailored to provide a multi-viscosity ink mixture which would be particularly useful over a given temperature range. The given temperature ranges of more than two mono-viscosity inks when mixed can be temperature specific. For example if a printer is to be used in a warehouse, a heated industrial area, and an office interchangeably, the ink can be compounded to accommodate the three or more given ambient temperatures. As a further example, some line printers are now moved from one environment to another, which changes the relationship of the ambient temperature. Using the two or more ink compounds of this invention can cause the ink to be temperature specific and perform in an improved way with respect to each ambient temperature.

In summation it has been found that an optimum blend of two, three or more inks having different viscosities can be made for use in impact printing applications such as line printing, and within other types of printers. The resulting product is a synergistic multi-viscosity blend that performs well throughout the temperature range anticipated in many applications. Other factors that influence the actual percentages of the different viscosity inks used to optimize the blend include, but need not be limited to the presence or absence of additives and pigments and the type of media to be printed upon.

The above-described embodiments of the present invention are merely meant to be illustrative and not limiting. It will thus be obvious to those skilled in the art that various changes and modifications may be made without departing from this invention in its broader aspects. Therefore, the appended claims encompass all such changes and modifications as fall within the true spirit and scope of this invention.

What is claimed is:

1. A printing ink for use in multiple temperatures comprising:
   a first mono-viscosity ink having a first viscosity at a pre-determined temperature; and
   a second mono-viscosity ink having a second viscosity at the pre-determined temperature, wherein the first and second viscosities are different, and wherein the first viscosity is approximately 1600 cps or higher at room temperature and the second viscosity is approximately 750 cps or lower at room temperature.

2. A printing ink for use in multiple temperatures comprising:
   a first mono-viscosity ink having a first viscosity at a pre-determined temperature; and
   a second mono-viscosity ink having a second viscosity at the pre-determined temperature, wherein the first and second viscosities are different, and wherein the approximate viscosity of the printing ink at the pre-determined temperature is equal to the sum of the first viscosity multiplied by the volume fraction of the first mono-viscosity ink and the second viscosity multiplied by the volume fraction of the second mono-viscosity ink.

3. The printing ink of claim 1, wherein the first mono-viscosity ink comprises a dye and a solvent.

4. A printing ink for use in multiple temperatures comprising:
   a first mono-viscosity ink having a first viscosity at a pre-determined temperature; and
   a second mono-viscosity ink having a second viscosity at the pre-determined temperature, wherein the first and second viscosities are different, wherein the first mono-viscosity ink comprises a dye and a solvent, and wherein the solvent is oleic acid.

5. The printing ink of claim 1, wherein the first ink has a higher concentration of dye than the second ink.

6. The printing ink of claim 1, wherein the first ink is about 30% to about 70% by volume and the second ink is about 70% to about 30% by volume.

7. The printing ink of claim 1, wherein the first ink is less than the second ink by volume.

8. A printing ink for use in multiple temperatures comprising:
    a first mono-viscosity, ink having a first viscosity at a pre-determined temperature; and
    a second mono-viscosity ink having a second viscosity at the pre-determined temperature, wherein the first and second viscosities are different, wherein the first viscosity is higher than the second viscosity, and wherein the first ink has a viscosity in the range of about 1100 to about 1800 cps and the second ink has a viscosity in the range of about 300 to about 900 cps.

9. The printing ink of claim 2, wherein the first mono-viscosity ink comprises a dye and a solvent.

10. The printing ink of claim 8, wherein the first mono-viscosity ink comprises a dye and a solvent.

11. The printing ink of claim 2, wherein the first ink has a higher concentration of dye than the second ink.

12. The printing ink of claim 4, wherein the first ink has a higher concentration of dye than the second ink.

13. The printing ink of claim 8, wherein the first ink has a higher concentration of dye than the second ink.

14. The printing ink of claim 2, wherein the first ink is about 30% to about 70% by volume and the second ink is about 70% to about 30% by volume.

15. The printing ink of claim 4, wherein the first ink is about 30% to about 70% by volume and the second ink is about 70% to about 30% by volume.

16. The printing ink of claim 8, wherein the first ink is about 30% to about 70% by volume and the second ink is about 70% to about 30% by volume.

17. The printing ink of claim 2, wherein the first ink is less than the second ink by volume.

18. The printing ink of claim 4, wherein the first ink is less than the second ink by volume.

19. The printing ink of claim 8, wherein the first ink is less than the second ink by volume.

* * * * *